United States Patent
Chen

(10) Patent No.: US 8,600,617 B2
(45) Date of Patent: Dec. 3, 2013

(54) VEHICLE LIGHT CONTROL METHOD AND DEVICE

(75) Inventor: Chun-Hsiung Chen, Kaohsiung (TW)

(73) Assignee: Kwang Yang Motor Co., Ltd., Kaohsiung (TW)

(*) Notice: Subject to any disclaimer, the term of this patent is extended or adjusted under 35 U.S.C. 154(b) by 0 days.

(21) Appl. No.: 13/588,443

(22) Filed: Aug. 17, 2012

(65) Prior Publication Data

US 2013/0218410 A1  Aug. 22, 2013

(30) Foreign Application Priority Data

Aug. 19, 2011  (TW) .............................. 100129760 A

(51) Int. Cl.
*G06F 7/00* (2006.01)
(52) U.S. Cl.
USPC ............................................. 701/36; 340/933
(58) Field of Classification Search
USPC ............................................. 701/36; 340/933
See application file for complete search history.

(56) References Cited

U.S. PATENT DOCUMENTS

| | | | | |
|---|---|---|---|---|
| 4,740,780 A * | 4/1988 | Brown et al. | ...................... | 345/7 |
| 6,120,159 A * | 9/2000 | Inoguchi et al. | ................. | 362/29 |
| 6,224,222 B1 * | 5/2001 | Inoguchi et al. | ................. | 362/29 |
| 7,429,918 B2 * | 9/2008 | Watanabe | ..................... | 340/468 |
| 7,527,120 B2 * | 5/2009 | Tatewaki et al. | ............... | 180/230 |
| 7,866,859 B2 * | 1/2011 | Suzuki et al. | ................. | 362/489 |

* cited by examiner

Primary Examiner — Russell Frejd
(74) Attorney, Agent, or Firm — Morgan, Lewis & Bockius LLP

(57) ABSTRACT

A vehicle light control method and device are provided for controlling a light unit of a vehicle. A control unit determines whether a vehicle speed of the vehicle detected by a vehicle speed detector is greater than zero and whether an engine rotational speed of an engine of the vehicle detected by an engine rotational speed detector is equal to zero. The control unit enables the light unit to emit light with a brightness based on the vehicle speed upon determining that the vehicle speed is greater than zero and the engine rotational speed is zero.

14 Claims, 4 Drawing Sheets

VEHICLE LIGHT CONTROL METHOD AND DEVICE

CROSS-REFERENCE TO RELATED APPLICATION

This application claims priority to Taiwanese Application No. 100129760, filed on Aug. 19, 2011.

BACKGROUND OF THE INVENTION

1. Field of the Invention

The invention relates to vehicle light control, and more particularly to a vehicle light control method and device.

2. Description of the Related Art

In a conventional vehicle light control device for controlling a headlight of a motorcycle, an engine rotational speed detector is used to detect a rotational speed of an engine of the motorcycle after the motorcycle is powered on. Then, a controller is operable to determine whether the rotational speed of the engine detected by the engine rotational speed detector is equal to zero. When the rotational speed of the engine is zero, i.e., the engine is not started, the controller does not turn on the headlight, i.e., no electric power supplied to the headlight. When the rotational speed of the engine is greater than zero, i.e., the engine is started, the controller controls the headlight to emit light with a brightness corresponding to the rotational speed of the engine.

However, when a user pushes the motorcycle in a dark environment but the engine cannot be started for some reasons (for example, when in a campus), the conventional vehicle light control device cannot turn on the headlight and it might not be safe to push the motorcycle in this situation.

SUMMARY OF THE INVENTION

Therefore, an object of the present invention is to provide vehicle light control method and device that can overcome the aforesaid drawbacks of the prior art.

According to one aspect of the present invention, there is provided a vehicle light control method for controlling a light unit of a vehicle. The vehicle further includes an engine, an engine rotational speed detector for detecting an engine rotational speed of the engine, a vehicle speed detector for detecting a vehicle speed of the vehicle, and a control unit. The vehicle light control method comprises the steps of:

a) after the vehicle is powered on, configuring the engine rotational speed detector to detect the engine rotational speed and configuring the vehicle speed detector to detect the vehicle speed;

b) configuring the control unit to determine whether the engine rotational speed detected in step a) is equal to zero and whether the vehicle speed detected in step a) is greater than zero; and c) when it is determined in step b) that the vehicle speed is greater than zero and the engine rotational speed is zero, configuring the control unit to enable the light unit to emit light with a brightness based on the vehicle speed detected in step a).

According to another aspect of the present invention, there is provided a vehicle light control device for controlling a light unit of a vehicle. The vehicle further includes an engine. The vehicle light control device comprises a vehicle speed detector, an engine rotational speed detector, and a control unit.

The vehicle speed detector is adapted to be mounted on the vehicle for detecting a vehicle speed of the vehicle to generate a vehicle speed signal corresponding to the vehicle speed detected thereby.

The engine rotational speed detector is adapted to be mounted on the vehicle for detecting an engine rotational speed of the engine to generate an engine rotational speed signal corresponding to the engine rotational speed detected thereby.

The control unit is connected electrically to the vehicle speed detector and the engine rotational speed detector for receiving the vehicle speed signal and the engine rotational speed signal therefrom. The control unit is adapted to be connected electrically to the light unit of the vehicle. The control unit is operable to determine, based on the vehicle speed signal and the engine rotational speed signal, whether the vehicle speed is greater than zero and whether the engine rotational speed is equal to zero.

The control unit enables the light unit of the vehicle to emit light with a brightness based on the vehicle speed upon determining that the vehicle speed is greater than zero and the engine rotational speed is zero.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
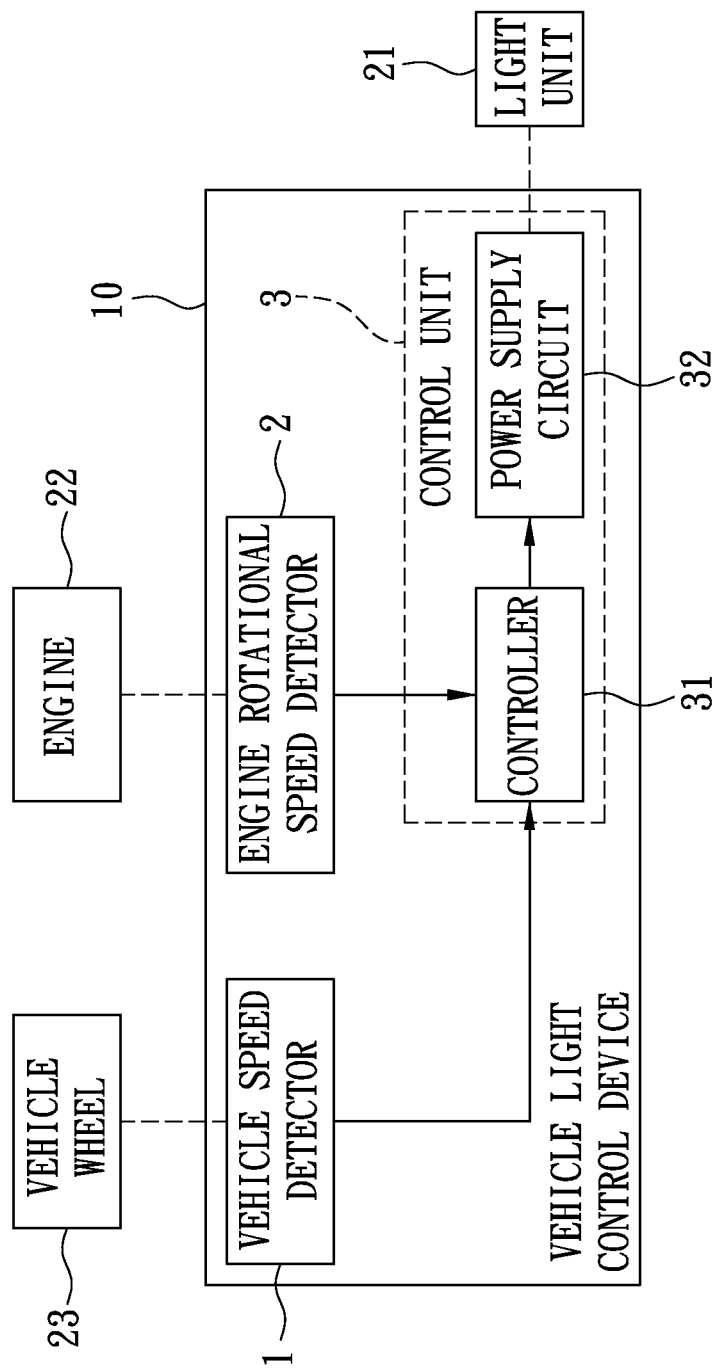
FIG. 1 is a schematic circuit block diagram illustrating the preferred embodiment of a vehicle light control device according to the present invention.
Figure 2:
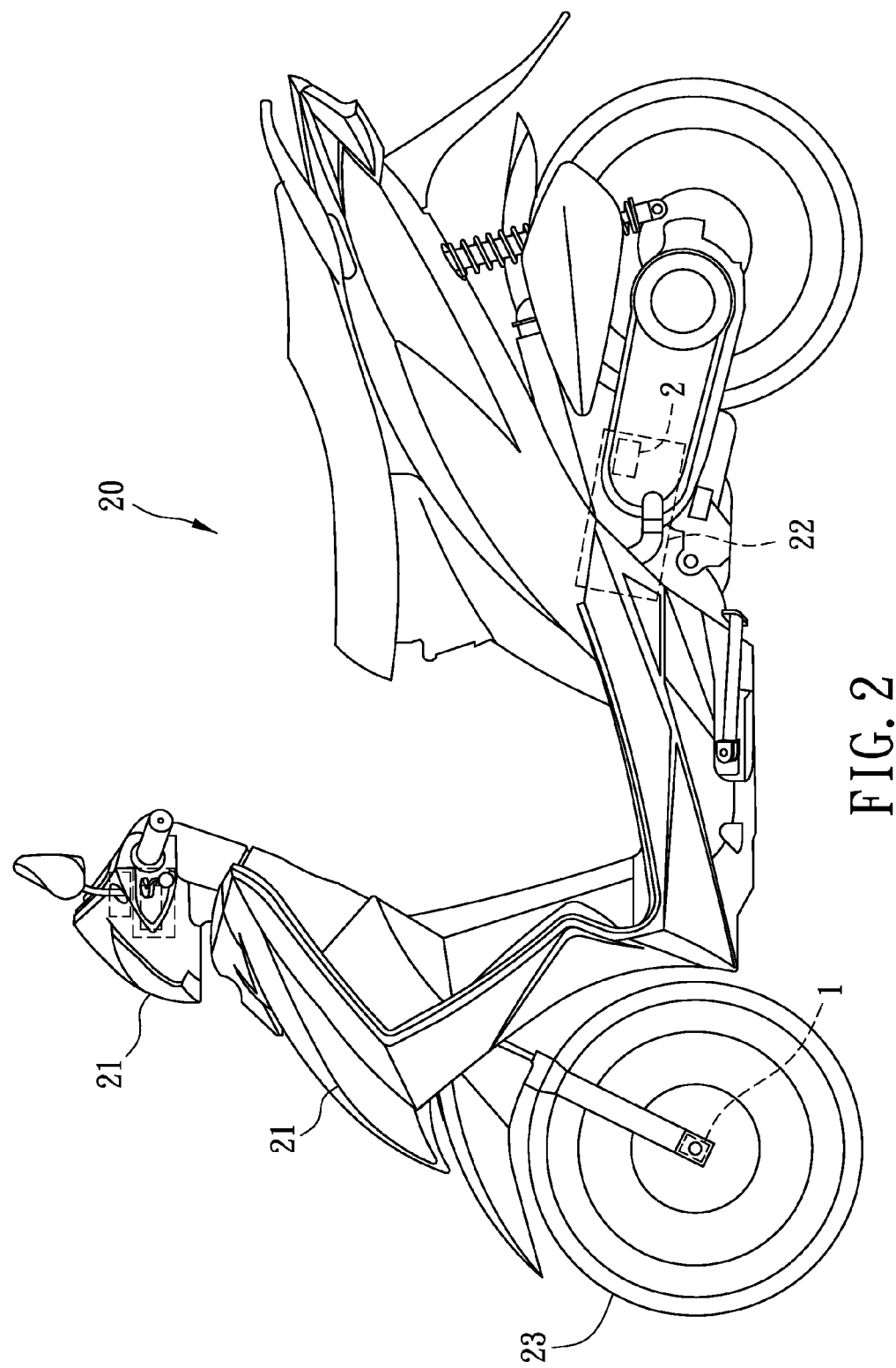
FIG. 2 is a schematic view showing a motorcycle mounted with the vehicle light control device of the preferred embodiment.

Referring to FIGS. 1 and 2, the preferred embodiment of a vehicle light control device 10 for a vehicle 20 according to the present invention is shown to include a vehicle speed detector 1, an engine rotational speed detector 2, and a control unit 3. In this embodiment, the vehicle 20 is a motorcycle that includes a light unit 21 including a headlight and a front light, an engine 22, and a vehicle wheel 23, as shown in FIG. 2. The engine 22 can be a carburetor engine or a jet engine.

The vehicle speed detector 1 is adapted to be mounted on the vehicle 20 for detecting a vehicle speed to generate a vehicle speed signal corresponding to the vehicle speed detected thereby. In this embodiment, the vehicle speed detector 1 detects the vehicle speed by detecting a rotational speed of the vehicle wheel 23.

The engine rotational speed detector 2 is adapted to be mounted on the vehicle 20 for detecting an engine rotational speed of the engine 22 to generate an engine rotational speed signal corresponding to the engine rotational speed detected thereby.

The control unit 3 is connected electrically to the vehicle speed detector 1 and the engine rotational speed detector 2 for receiving the vehicle speed signal and the engine rotational speed signal therefrom. The control unit 3 is adapted to be connected electrically to the light unit 21 of the vehicle 20. The control unit 3 is operable to determine, based on the vehicle speed signal and the engine rotational speed signal, whether the vehicle speed is equal to zero and whether the engine rotational speed is equal to zero, i.e., the engine 22 is not started. The control unit 3 enables the light unit 21 of the vehicle 20 to emit light and controls the brightness of the light emitted by the light unit 21 of the vehicle 20 based on the vehicle speed upon determining that the vehicle speed is greater than zero and the engine rotational speed is zero, i.e., the vehicle 20 moves but the engine 22 is not started. The control unit 3 enables the light unit 21 of the vehicle 20 to emit light and controls the brightness of the light emitted by the light unit 21 of the vehicle 20 based on the engine rotational speed upon determining that the engine rotational speed is greater than zero, i.e., the engine 22 is started.

In this embodiment, the control unit 3 includes a controller 31 and a power supply circuit 32.

The controller 31 is connected electrically to the vehicle speed detector 1 and the engine rotational speed detector 2. The controller 31 is adapted to receive respectively the vehicle speed signal and the engine rotational speed signal from the vehicle speed detector 1 and the engine rotational speed detector 2, to determine whether the vehicle speed is equal to zero and whether the engine rotational speed is equal to zero, and to generate a control signal based on the vehicle speed signal and the engine rotational speed signal.

The power supply circuit 32 is connected electrically to the controller 31 for receiving the control signal therefrom, and is adapted to be connected electrically to the light unit 21 of the vehicle 20. The power supply circuit 32 supplies electric power to the light unit 21 of the vehicle 20 based on the control signal received from the controller 31.

When the controller 31 determines that the vehicle speed is greater than zero and the engine rotational speed is zero, the control signal generated by the controller 31 corresponds to the vehicle speed. When the controller 31 determines that the engine rotational speed is greater than zero, the control signal generated by the controller 31 corresponds to the engine rotational speed.

More specifically, while the controller 31 of the control unit 3 determines that the engine rotational speed is zero and the vehicle speed is greater than zero, the controller 31 of the control unit 3 further determines whether the vehicle speed is higher than a predetermined vehicle speed threshold. In this embodiment, the predetermined vehicle speed threshold is 10 km/hr. Thus, upon determining that the vehicle speed is higher than the predetermined vehicle speed threshold, the controller 31 of the control unit 3 generates the control signal allowing the light unit 21 of the vehicle 20 to emit light with a predetermined first brightness in response to the electric power supplied by the power supply circuit 32 based on the control signal from the controller 31. In this case, the control signal generated by the controller 31 corresponds to a virtual engine rotational speed of 6000 rpm. Upon determining that the vehicle speed is not higher than the predetermined vehicle speed threshold, the controller 31 of the control unit 3 generates the control signal allowing the light unit 21 of the vehicle 20 to emit light with a predetermined second brightness less than the predetermined first brightness in response to the electric power supplied by the power supply circuit 32 based on the control signal from the controller 31. In this case, the control signal generated by the controller 31 corresponds to a virtual engine rotational speed of 1500 rpm. In addition, the electric power is processed through pulse width modulation corresponding to the control signal.

On the other hand, while the controller 31 of the control unit 3 determines that the engine rotational speed is greater than zero, the controller 31 of the control unit 3 further determines whether the engine rotational speed is higher than a predetermined engine rotational speed threshold. In this embodiment, the predetermined engine rotational speed threshold is 3000 rpm. Thus, upon determining that the engine rotational speed is higher than the predetermined engine rotational speed threshold, the controller 31 of the control unit 3 generates the control signal allowing the light unit 21 of the vehicle 20 to emit the light with the predetermined first brightness in response to the electric power supplied by the power supply circuit 32 based on the control signal from the controller 31. Upon determining that the engine rotational speed is not higher than the predetermined engine rotational speed threshold, the controller 31 of the control unit 3 generates the control signal allowing the light unit 21 of the vehicle 20 to emit the light with the predetermined second brightness in response to the electric power supplied by the power supply circuit 32 based on the control signal from the controller 31.

It is noted that, while the controller 31 of the control unit 3 determines that the vehicle speed is zero and the engine rotational speed is greater than zero, i.e., the engine 22 is started but the vehicle 20 does not move, the controller 31 of the control unit 3 further determines whether the duration of the vehicle speed being zero is over a predetermined time period. In this embodiment, the predetermined time period is a time period of 3 min. Thus, upon determining that the duration of the vehicle speed being equal to zero is over the predetermined time period, the controller 31 outputs a terminating signal to the power supply circuit 32 such that the power supply circuit 32 terminates supply of the electric power to the light unit 21 of the vehicle 20 in response to the terminating signal from the controller 31, thereby terminating illumination of the light unit 21 of the vehicle 20.

Furthermore, it is noted that the control unit 3 can be integrated into an electronic control unit (ECU) or a microprocessor chip of a vehicle dashboard module.

Figure 3A:
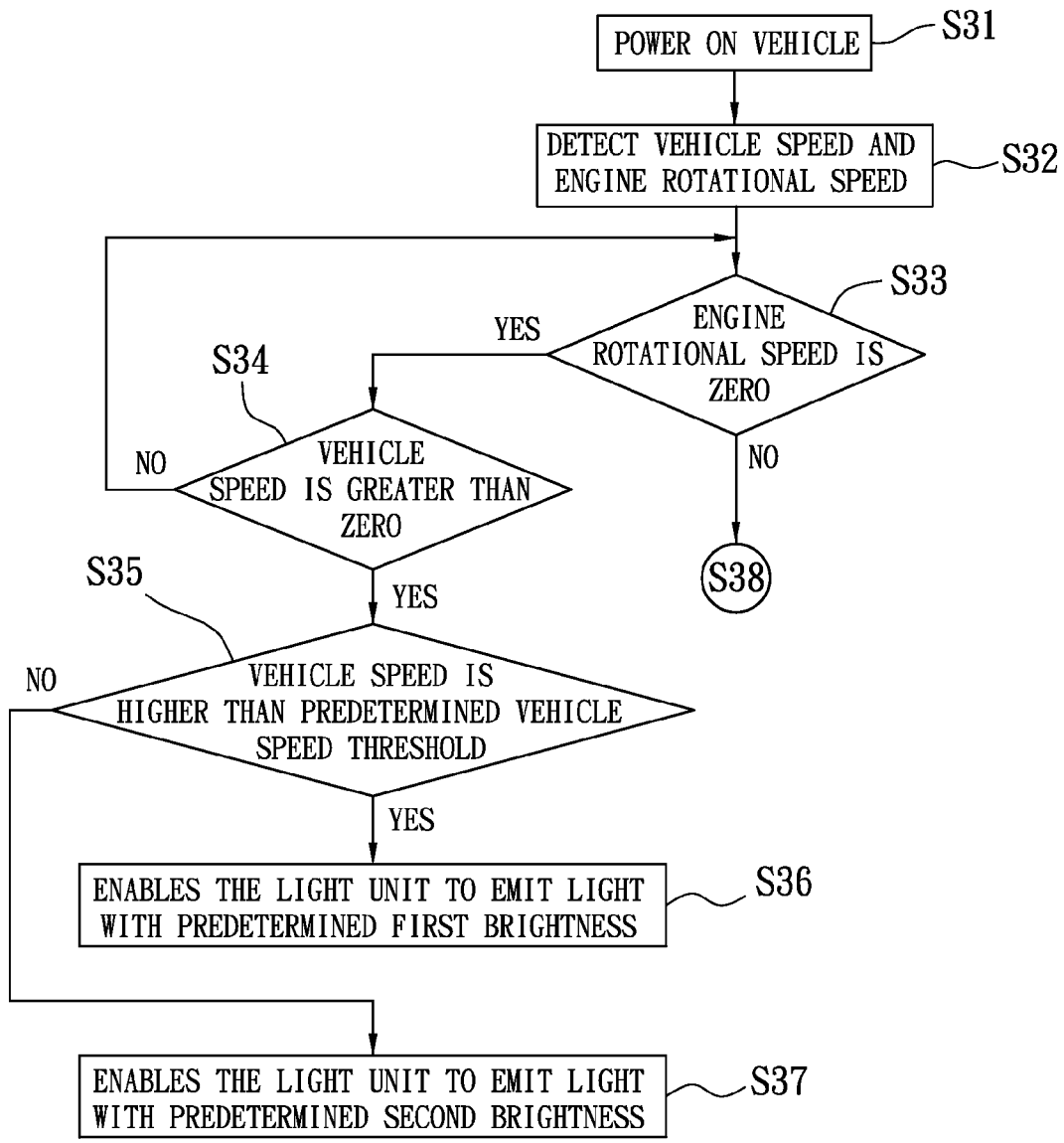
FIGS. 3a and 3b are flow charts of a vehicle light control method performed by the vehicle light control device of the preferred embodiment.
Figure 3B:
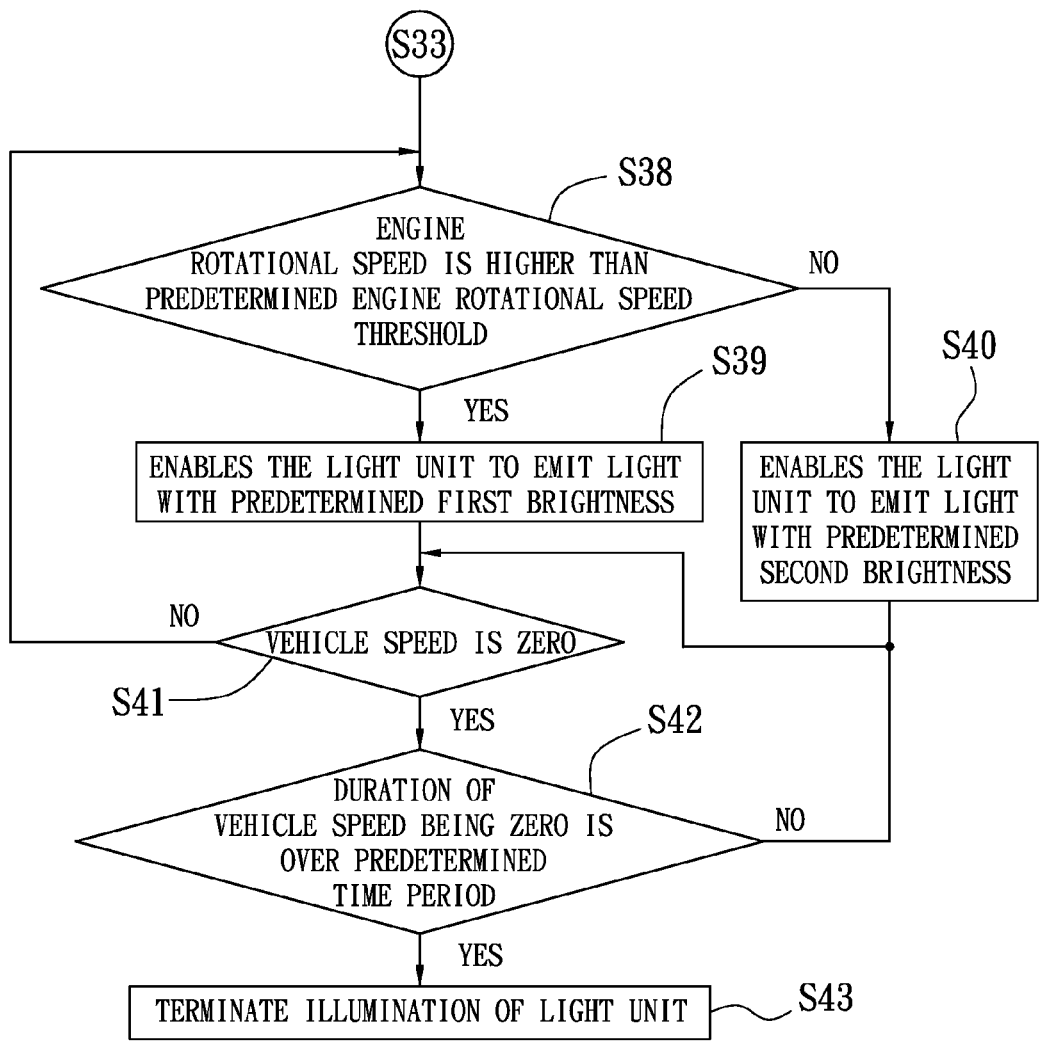

FIGS. 3a and 3b illustrate flow charts of a vehicle light control method performed by the vehicle light control device 10 of the preferred embodiment.

In step S31, the vehicle 20 is powered on.

In step S32, the vehicle speed detector 1 starts detecting the vehicle speed to generate the vehicle speed signal, and the engine rotational speed detector 2 starts detecting the engine rotational speed to generate the engine rotational speed signal.

In step S33, the controller 31 of the control unit 3 determines, based on the engine rotational speed signal from the engine rotational speed detector 2, whether the engine rotational speed is equal to zero. If the result is affirmative, the flow proceeds to step S34. Otherwise, the flow goes to step S38.

In step S34, the controller 31 of the control unit 3 determines, based on the vehicle speed signal from the vehicle speed detector 1, whether the vehicle speed is greater than zero. If the result is affirmative, the flow proceeds to step S35. Otherwise, the flow goes back to step S33.

In step S35, the controller 31 of the control unit 3 determines whether the vehicle speed is higher than the predetermined vehicle speed threshold. If the result is affirmative, the flow proceeds to step S36. Otherwise, the flow proceeds to step S37.

In step S36, the control unit 3 enables the light unit 21 of the vehicle 20 to emit the light with the predetermined first brightness by supplying the electric power from the power supply circuit 32 to the light unit 21 based on the control signal from the controller 31 of the control unit 3.

In step S37, the control unit 3 enables the light unit 21 of the vehicle 20 to emit the light with the predetermined second brightness by supplying the electric power from the power supply circuit 32 to the light unit 21 based on the control signal from the controller 31 of the control unit 3.

In step S38, when the engine rotational speed is greater than zero, the controller 31 of the control unit 3 determines whether the engine rotational speed is higher than the predetermined engine rotational speed threshold. If the result is affirmative, the flow proceeds to step S39. Otherwise, the flow goes to step S40.

In step S39, similar to step S36, the control unit 3 enables the light unit 21 of the vehicle 20 to emit the light with the predetermined first brightness by supplying the electric power from the power supply circuit 32 to the light unit 21 based on the control signal from the controller 31 of the control unit 3. Then, the flow proceeds to step S41.

In step S40, similar to step S37, the control unit 3 enables the light unit 21 of the vehicle 20 to emit the light with the predetermined second brightness by supplying the electric power from the power supply circuit 32 to the light unit 21 based on the control signal from the controller 31 of the control unit 3. Then, the flow proceeds to step S41.

In step S41, the controller 31 of the control unit 3 determines, based on the vehicle speed signal from the vehicle speed detector 1, whether the vehicle speed is zero. If the result is affirmative, the flow proceeds to step S42. Otherwise, the flow goes back to step S38.

In step S42, the controller 31 of the control unit 3 determines whether the duration of the vehicle speed being zero is over the predetermined time period. If the result is affirmative, the flow proceeds to step S43. In this case, the controller 31 outputs the terminating signal to the power supply circuit 32 when the result determined in step S42 is affirmative. Otherwise, the flow goes backs to step S41.

In step S43, the power supply circuit 32 terminates supply of the electric power in response to the terminating signal from the controller 31 such that illumination of the light unit 21 is terminated.

To sum up, when the vehicle speed is greater than zero but the engine 22 is not started, the vehicle light control device 10 of the present invention enables the light unit 21 of the vehicle 20 to emit the light with the predetermined first or second brightness. Therefore, when a user pushes the vehicle 20 in a dark environment, safety of the user in the dark environment can be ensured. In addition, the vehicle light control device 10 of the present invention can also meet relevant safety requirements for motorcycles required by Economic Commission for Europe (ECE).

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

The invention claimed is:

1. A vehicle light control method for controlling a light unit of a vehicle, the vehicle further including an engine, an engine rotational speed detector for detecting an engine rotational speed of the engine, a vehicle speed detector for detecting a vehicle speed of the vehicle, and a control unit, said vehicle light control method comprising the steps of:
   a) after the vehicle is powered on, configuring the engine rotational speed detector to detect the engine rotational speed and configuring the vehicle speed detector to detect the vehicle speed;
   b) configuring the control unit to determine whether the engine rotational speed detected in step a) is equal to zero;
   c) when it is determined in step b) that the engine rotational speed is equal to zero, configuring the control unit to determine whether the vehicle speed detected in step a) is greater than zero; and
   d) when it is determined in step c) that the vehicle speed is greater than zero, configuring the control unit to enable the light unit to emit light with a brightness based on the vehicle speed detected in step a).

2. The vehicle light control method as claimed in claim 1, wherein step d) includes the sub-steps of:
   d-1) configuring the control unit to determine whether the vehicle speed is higher than a predetermined vehicle speed threshold; and
   d-2) when it is determined in step d-1) that the vehicle speed is higher than the predetermined vehicle speed threshold, configuring the control unit to enable the light unit to emit light with a predetermined first brightness; and
   d-3) when it is determined in step d-1) that the vehicle speed is not higher than the predetermined vehicle speed threshold, configuring the control unit to enable the light unit to emit light with a predetermined second brightness less than the predetermined first brightness.

3. The vehicle speed control method as claimed in claim 1, further comprising the step of:
   e) when it is determined in step b) that the engine rotational speed is greater than zero, configuring the control unit to enable the light unit to emit light with a brightness based on the engine rotational speed detected in step a).

4. The vehicle speed control method as claimed in claim 3, wherein step e) includes the sub-steps of:
   e-1) configuring the control unit to determine whether the engine rotational speed is higher than a predetermined engine rotational speed threshold;
   e-2) when it is determined in step e-1) that the engine rotational speed is higher than the predetermined engine rotational speed threshold, configuring the control unit to enable the light unit to emit light with a predetermined first brightness; and
   e-3) when it is determined in step e-1) that the engine rotational speed is not higher than the predetermined engine rotational speed threshold, configuring the control unit to enable the light unit to emit light with a predetermined second brightness less than the predetermined first brightness.

5. The vehicle light control method as claimed in claim 3, further comprising, after step e), the steps of:
   f) configuring the control unit to determine whether the vehicle speed is equal to zero;
   g) when it is determined in step f) that the vehicle speed is equal zero, configuring the control unit to determine whether the duration of the vehicle speed being equal to zero is over a predetermined time period; and
   h) when it is determined in step g) that the duration of the vehicle speed being equal to zero is over the predetermined time period, configuring the control unit to terminate illumination of the light unit.

6. A vehicle light control device for controlling a light unit of a vehicle, the vehicle further including and an engine, said vehicle light control device comprising:
   a vehicle speed detector adapted to be mounted on the vehicle for detecting a vehicle speed of the vehicle to generate a vehicle speed signal corresponding to the vehicle speed detected thereby;

an engine rotational speed detector adapted to be mounted on the vehicle for detecting an engine rotational speed of the engine to generate an engine rotational speed signal corresponding to the engine rotational speed detected thereby; and a control unit that is connected electrically to said vehicle speed detector and said engine rotational speed detector for receiving the vehicle speed signal and the engine rotational speed signal therefrom, that is adapted to be connected electrically to the light unit of the vehicle, and that is operable to determine, based on the vehicle speed signal and the engine rotational speed signal, whether the vehicle speed is greater than zero and whether the engine rotational speed is equal to zero, and enable the light unit of the vehicle to emit light with a brightness based on the vehicle speed upon determining that the vehicle speed is greater than zero and the engine rotational speed is zero.

7. The vehicle light control device as claimed in claim 6, wherein said control unit includes:

a controller connected electrically to said vehicle speed detector and said engine rotational speed detector, receiving respectively the vehicle speed signal and the engine rotational speed signal from said vehicle speed detector and said engine rotational speed detector, determining whether the vehicle speed is greater than zero and whether the engine rotational speed is equal to zero, and generating a control signal based on the vehicle speed signal and the engine rotational speed signal; and a power supply circuit connected electrically to said controller for receiving the control signal therefrom, adapted to be connected electrically to the light unit of the vehicle, and adapted to supply electric power to the light unit of the vehicle for illumination based on the control signal received from said controller;

wherein, when said controller determines that the vehicle speed is greater than zero and the engine rotational speed is zero, the control signal generated by said controller corresponds to the vehicle speed.

8. The vehicle light control device as claimed in claim 7, wherein, while said controller of said control unit determines that the engine rotational speed is zero and the vehicle speed is greater than zero:

said controller of said control unit further determines whether the vehicle speed is higher than a predetermined vehicle speed threshold;

upon determining that the vehicle speed is higher than the predetermined vehicle speed threshold, said controller of said control unit generates the control signal allowing the light unit of the vehicle to emit light with a predetermined first brightness in response to the electric power supplied by said power supply circuit based on the control signal from said controller; and upon determining that the vehicle speed is not higher than the predetermined vehicle speed threshold, said controller of said control unit generates the control signal allowing the light unit of the vehicle to emit light with a predetermined second brightness less than the predetermined first brightness in response to the electric power supplied by said power supply circuit based on the control signal from said controller.

9. The vehicle light control device as claimed in claim 8, wherein:

the control signal generated by said controller of said control unit, upon determining that the vehicle speed is higher than the predetermined vehicle speed threshold, corresponds to a virtual engine rotational speed of 6000 rpm; and the control signal generated by said controller of said control unit, upon determining that the vehicle speed is not higher than the predetermined vehicle speed threshold, corresponds to a virtual engine rotational speed of 1500 rpm.

10. The vehicle light control device as claimed in claim 8, wherein the predetermined vehicle speed threshold is 10 km/hr.

11. The vehicle light control device as claimed in claim 7, wherein, when said controller of said control unit determines that the engine rotational speed is greater than zero, the control signal generated by said controller of said control unit corresponds to the engine rotational speed.

12. The vehicle light control device as claimed in claim 11, wherein, while said controller of said control unit determines that the engine rotational speed is greater than zero:

said controller of said control unit further determines whether the engine rotational speed is higher than a predetermined engine rotational speed threshold;

upon determining that the engine rotational speed is higher than the predetermined engine rotational speed threshold, said controller of said control unit generates the control signal allowing the light unit of the vehicle to emit light with a predetermined first brightness in response to the electric power supplied by said power supply circuit based on the control signal from said controller; and upon determining that the engine rotational speed is not higher than the predetermined engine rotational speed threshold, said controller of said control unit generates the control signal allowing the light unit of the vehicle to emit light with a predetermined second brightness less than the predetermined first brightness in response to the electric power supplied by said power supply circuit based on the control signal from said controller.

13. The vehicle light control device as claimed in claim 12, wherein the predetermined engine rotational speed threshold is 3000 rpm.

14. The vehicle light control device as claimed in claim 11, wherein, while said controller of said control unit determines that the vehicle speed is zero and the engine rotational speed is greater than zero, said controller of said control unit further determines whether a duration of the vehicle speed being equal to zero is over a predetermined time period, and outputs a terminating signal to said power supply circuit upon determining that the duration of the vehicle speed being equal to zero is over the predetermined time period such that said power supply circuit terminates supply of the electric power to the light unit of the vehicle in response to the terminating signal from said controller, thereby terminating illumination of the light unit of the vehicle.

\* \* \* \* \*